(12) United States Patent
Paschini et al.

(10) Patent No.: US 10,977,645 B2
(45) Date of Patent: Apr. 13, 2021

(54) TOKENIZED ASSET BACKED BY GOVERNMENT BONDS AND IDENTITY AND RISK SCORING OF ASSOCIATED TOKEN TRANSACTIONS

(71) Applicants: Miles Paschini, San Diego, CA (US); Nitin Agarwal, Hyderabad (IN)

(72) Inventors: Miles Paschini, San Diego, CA (US); Nitin Agarwal, Hyderabad (IN)

( * ) Notice: Subject to any disclaimer, the term of this patent is extended or adjusted under 35 U.S.C. 154(b) by 0 days.

(21) Appl. No.: 16/897,696

(22) Filed: Jun. 10, 2020

(65) Prior Publication Data

US 2020/0387891 A1 Dec. 10, 2020

Related U.S. Application Data

(60) Provisional application No. 62/859,665, filed on Jun. 10, 2019.

(51) Int. Cl.
  *G06Q 20/36* (2012.01)
  *H04L 9/06* (2006.01)
  *G06Q 20/40* (2012.01)

(52) U.S. Cl.
  CPC ..... *G06Q 20/3672* (2013.01); *G06Q 20/3674* (2013.01); *G06Q 20/3678* (2013.01); *G06Q 20/4016* (2013.01); *H04L 9/0637* (2013.01)

(58) Field of Classification Search
  CPC ...... G06Q 40/025; G06Q 40/02; G06Q 30/02; G06Q 20/4014; G06Q 20/4016;
  (Continued)

(56) References Cited

U.S. PATENT DOCUMENTS

| 10,373,129 B1* | 8/2019 | James | H04L 9/3247 |
| 2015/0081407 A1* | 3/2015 | Jeetu | G06Q 40/04 |
| | | | 705/14.13 |

(Continued)

FOREIGN PATENT DOCUMENTS

| KR | 101946557 B1 | 5/2019 |
| WO | WO-2018/232297 A1 | 12/2018 |

OTHER PUBLICATIONS

International Search Report dated Sep. 1, 2020, for PCT Patent Application No. PCT/US2020/037016, filed on Jun. 10, 2020, 4 pages.

(Continued)

*Primary Examiner* — Neha Patel
*Assistant Examiner* — Chunling Ding
(74) *Attorney, Agent, or Firm* — Cooley LLP

(57) ABSTRACT

A method for facilitating the exchange of a stable cryptocurrency collateralized by government-issued debt. First granularity parameters are received through a first wallet interface of a first digital wallet. A first restricted use key is generated based upon the first granularity parameters and provided to an owner of a second digital wallet. A second restricted use key is generated based upon second granularity parameters received through a second wallet interface associated with the second digital wallet. Information from a blockchain wallet is accessed using the second restricted use key wherein the information relates to one or more of an ID classification and risk score of the second wallet owner at a level of detail determined by the second granularity parameters. An indication to proceed with a transaction between the first digital wallet and the second digital wallet may then be received through the first wallet interface.

25 Claims, 8 Drawing Sheets

(58) Field of Classification Search
CPC .... G06Q 30/0207; G06Q 20/20; G06Q 20/24; G06Q 20/3672; G06Q 20/3678; G06Q 20/3674; H04L 9/0637; H04L 2209/38; H04L 2209/56; H04L 9/3239
See application file for complete search history.

(56) References Cited

U.S. PATENT DOCUMENTS

| | | | |
|---|---|---|---|
| 2016/0117678 A1* | 4/2016 | Weidenmiller | G06Q 20/34 705/44 |
| 2016/0239831 A1* | 8/2016 | Saunders | G06Q 20/10 |
| 2018/0240107 A1* | 8/2018 | Andrade | G06Q 20/36 |
| 2019/0034936 A1 | 1/2019 | Nolan et al. | |
| 2020/0202331 A1* | 6/2020 | Vudathu | H04L 9/0866 |
| 2020/0311808 A1* | 10/2020 | Srivastava | G06Q 10/067 |
| 2020/0320222 A1* | 10/2020 | Zhou | H04L 9/3247 |
| 2020/0380520 A1* | 12/2020 | Kavali | G06Q 20/4016 |

OTHER PUBLICATIONS

Written Opinion of the International Searching Authority dated Sep. 1, 2020, for PCT Patent Application No. PCT/US2020/037016, filed on Jun. 10, 2020, 7 pages.

* cited by examiner

TOKENIZED ASSET BACKED BY GOVERNMENT BONDS AND IDENTITY AND RISK SCORING OF ASSOCIATED TOKEN TRANSACTIONS

CROSS-REFERENCE TO RELATED APPLICATIONS

This application claims priority to and the benefit of U.S. Provisional Patent Application No. 62/859,665, TOKENIZED ASSET BACKED BY GOVERNMENT BONDS AND RISK SCORING OF ASSOCIATED TOKEN TRANSACTIONS, filed on Jun. 10, 2019, the disclosure of which is incorporated herein by reference in its entirety for all purposes.

FIELD

This disclosure relates generally to distributed digital systems and methods for exchanging value such as, for example, cryptocurrency systems.

BACKGROUND

A cryptocurrency is a digital asset designed to be employed as a medium of exchange. Existing cryptocurrencies use strong cryptography to secure financial transactions, control the creation of additional units, and verify the transfer of assets. In one form cryptocurrencies use decentralized control as opposed to centralized digital currency and central banking systems.

While cryptocurrencies such as Bitcoin and Ethereum are gaining popularity, they are still not widely accepted by merchants for goods or services. A merchant choosing to accept cryptocurrency as a form of payment assumes the risk that it will be able to use the cryptocurrency to make payments to other vendors or exchange the cryptocurrency for legal tender and assume the risk of not knowing the identity of the counter party nor transactional risk history of the counter party. Even when such exchange is possible, volatility in the value of a cryptocurrency becomes another risk undertaken by those merchants choosing to accept it.

In light of the exchange rate volatility of conventional cryptocurrencies, alternative cryptocurrency systems have been developed. As one example a "stablecoin" is a cryptocurrency having a value pegged to something other than the perceived value of a cryptocurrency token. A stablecoin may be backed by some "stable" asset or basket of assets. For example, a stablecoin can be pegged to a legal tender fiat currency, to an exchange traded commodity such as gold, or to some other asset.

A significant disadvantage of stablecoins is that although they may utilize a decentralized network for trading, the assets backing a stable coin are centrally owned or controlled. In the case in which a stablecoin is pegged to a fiat currency, a bank or other financial institution generally holds an amount of the fiat currency sufficient to back the outstanding supply of the stablecoin. However, this effectively centralizes control of the assets which back or otherwise leverage the stablecoin, creating failure risks and undermining one of the primary attractions of "decentralized" cryptocurrencies. For example, to the extent a bank or other financial institution holding a fiat currency underpinning the stablecoin fails, the holders of the stablecoin incur losses. Finally, many banks are reticent to become involved with stablecoins because of the generally anonymous nature of the stablecoin transactions.

SUMMARY

The system and methods disclose herein address the issues referenced above by enabling the users to be identified, verified and scoring of their transactions tracked on the blockchain.

Disclosed herein is a system enabling a tokenized crypto asset backed by sovereign debt (or "stable coin") to be traded in a controlled network configured to score and otherwise rate the risk of trading with counterparties on the network. The stable coin be pegged to a government issued fiat currency (e.g., USD, EUR) and collateralized by purchasing and holding sovereign debt denominated in the same currency (e.g., U.S. treasuries or European Central Bank (ECB) bonds). That is, stable coin in USD is backed by U.S. government debt instruments, EUR-pegged stable coins are backed by ECB debt, and so on. The government bonds are kept in regulated financial institutions. Since the tokenized crypto asset is not backed by or held in any one bank but is instead backed by government debt, the stability of the tokenized crypto asset is more akin to the stability of the government debt rather than to the stability of a single bank holding collateral in fiat currency. Banks can fail and pose a risk to any decentralized tokenized asset which is backed by an asset such as fiat money in a bank or gold in a warehouse. For example, the bank holding the funds can go insolvent, be stripped of its licenses or be sanctioned by governments. By placing the collateral for the tokenized crypto asset into sovereign debt such as government treasury bonds, these banking-related risks are eliminated.

In order to manage liquidity demands a certain percentage of the total outstanding value of the tokenized crypto asset is held in bank accounts across the globe, solely for the purpose of making daily settlement requirements to token holders requesting redemption back to the pegged fiat currency. In one implementation the liquidity calculations are managed by an artificial intelligence-based service configured to determine the daily liquidity requirements, such as a fiat currency daily settlement balance 178, and fiat settlements routes to utilize (least cost routing).

Each user of the system may be issued a wallet address comprising a public and private key pair. Verification of the identity of a user will occur when, for example, a wallet is issued and may follow accepted standards (e.g., Bank Secrecy Act (BSA) standards). In general, the key pair comprising a wallet address is associated with any identity documents provided by the user and/or acceptable identity verification methods employed and is also associated with a risk score for the user and stored as meta data associated with the wallet and user.

In embodiment a smart contract issues new tokens to a given wallet address when the user of the wallet provides fiat money in the same currency as the tokenized asset. Some or all of this fiat money is then used to purchase government-issued bonds denominated in the fiat currency. The token may be listed and traded on alternate crypto asset exchanges globally.

In one implementation the wallet address will have a flag associated with identify verification and fields indicative of a risk score associated with the wallet. For example, an identity-related flag could indicate that the verification meets, for example, one or both of European central bank standards and BSA standards. This enables counterparties seeking to trade with the user associated with the wallet to know whether the identity of the user has been verified and to have a sense of the type of transactions (e.g., potentially risky or likely benign) with which the user of the wallet has been associated, as well as access to risk data, identity documents (such as passports copies and proof of address documents). The identity and risk score data are stored on the blockchain and are able to be retrieved by the wallet user creating a restricted used key which is generated by the user and determines the restrictions associated with the retrieval of the data, including options including summary data, file access (such as copies of identity documents), risk scores and expiration date of the restricted use key. Restricted use keys are provided to counter parties in which the wallet may make transactions with such as personal transactions, vendors, financial institutions, and government agencies.

The risk score for a given user may be based on the user's actions, transactions, Know Your Customer (KYC) and/or Know Your Business (KYB) data and criteria, as well as geographical and other information. KYC and/or KYB documents can be verified by more than one source to strengthen the score of the validity of the documents and the results of these confirmations are recorded on the block chain associated with the wallet address. The KYC and KYB data verification data may also be published in a governance model and be identified by a class conformity (i.e., conforms with BSA, conforms with EEA Central Bank, conforms with Chinese regulatory, etc.). The identity and risk score data are stored on the blockchain and are able to be retrieved by the wallet user creating a restricted used key which is generated by the user and determines the restrictions associated with the retrieval of the data, including options including summary data, file access (such as copies of identity documents), risk scores and expiration date of the restricted use key. Restricted use keys are provided to counter parties in which the wallet may make transactions with such as personal transactions, vendors, financial institutions and government agencies.

In one implementation users of the token system require a minimum KYC threshold be met (base class conformity) and any system participant can limit its transactions with other parties based upon the KYC level (class conformity) and Risk Score of a given Wallet. For example a person in the U.S. wanting to make a transfer to a person in Mexico, the counterparties can require that both the sender and receiver are in class conformity with the KYC requirements of their respective nations. This would be able to be retrieved from the Wallet address restricted use key with data similar to below:

KYC: Verified
KYC Class Conformity: USA BSA, EEA Central Bank, ETC.
Risk Score: (a score between 0 and 1000), 1000 being highest risk
Documents available: Passport, Driver's license, utility bill etc.
Documents details (document number, expiration date, issuing body, personal information etc.

Users will be able to provide counter parties access to the KYC data in their profiles by providing the counterparty a restricted use key to unlock the data files. A Risk Score algorithm will be published (along with on-chain governance to administer changes) and summarized data will be available from the public address for parties having been provided a restricted use key from the wallet user.

In one implementation all participants in the network are identifiable by their public address (along with KYC and Risk Scores). The system may determine a participant's risk score using an artificial intelligence (AI) algorithm which may take into account, for example, actions and data associated with network participants. The maintenance of risk scores ensures the credibility of network participants and mitigates the risk that the network is used for illicit activities (e.g., money laundering and financing of terrorist organizations). This incents, for example, participants seeking a low risk score to provide KYC data in their wallet and to conduct transactions with other verified and low risk score counterparties. The risk score has the benefits like a FICO score in credit rating systems as it assists counterparties in mitigating risks.

The risk score algorithm will preferably take geography and transaction amounts into consideration. For example, a wallet opened by someone in Iran (a sanctioned country) will typically start with a higher risk score than a wallet opened by a U.S. citizen. Similarly, a wallet used for paying very large sums to wallet associated with a user in a country generally deemed to be risky will likely have a much higher risk score than a wallet used to pay relatively small amounts to a known counterparty in the U.S. Thus, in order to maintain a favorable risk score, a user of a wallet may specify that they will only transact with other wallets having relatively good risk scores and for which identity verification has been verified.

Thus, as a consequence of associating a risk score with each wallet, money holding and transfer will become auditable, reliable and reportable, thereby alleviating any AML issues.

In one aspect the disclosure relates to a computer-implemented system for facilitating the issuance and exchange of a stable cryptocurrency collateralized by government-issued debt, the system comprising: a management platform in communication with a transaction validation and recording network including a plurality of distributed nodes configured to store blockchain data structures. The management platform includes a memory configured to store computer program instructions relating to at least a smart contract module and an identity (ID) and risk score module, and one or more physical computer processors configured by the computer program instructions to implement at least the smart contract module and the ID and risk score module. The computer program instructions include instructions for establishing a first digital wallet associated with a first user and a second digital wallet associated with a second user. The instructions further include instructions for determining, based upon user parameters and financial information associated with the first user, first wallet metadata for the first digital wallet wherein the first wallet metadata includes at least one of a first risk score and a first ID verification classification. The instructions also include storing the first wallet metadata on a blockchain within the transaction validation and recording network and enabling, using a restricted use key generated based upon granularity information associated with the first digital wallet, the second digital wallet to access the first wallet metadata stored on the blockchain at a level of granularity determined by the granularity information. The instructions further include instructions for receiving a first transaction request involving at least the first digital wallet and the second digital wallet, and responding to the first transaction request based upon at least one of: (i) a comparison of the first wallet metadata to transaction rules associated with the second digital wallet, and (ii) user input provided by the second user upon consideration of the first wallet metadata at the level of granularity determined by the granularity information.

The instructions for evaluating may also include instructions for comparing second wallet metadata associated with the second digital wallet to additional transaction rules associated with the first digital wallet and for facilitating completion of a first transaction corresponding to the first transaction request and recording the first transaction in the blockchain.

When the first transaction request corresponds to a transfer request, the instructions may further include instructions for transferring, based upon the evaluating, a specified number of tokens of the stable cryptocurrency from the first digital wallet to the second digital wallet.

The instructions may further include instruction for receiving a second transaction request involving at least the first digital wallet and for evaluating the second transaction request based upon additional transaction rules associated with the first digital wallet. When the second transaction request corresponds to a redemption request, the instructions may further include instructions for redeeming, subsequent to the evaluating the second transaction request, a specified number of tokens of the stable cryptocurrency from the first digital wallet.

The instructions may further include instructions for adjusting the first risk score based on any of: (i) rejection of the first transaction request, (ii) acceptance of the first transaction request, and (iii) a completed transfer of a specified number of tokens of the stable cryptocurrency from the first digital wallet to the second digital wallet.

The memory may be further configured to store instructions for an artificial intelligence (AI) engine, the instructions for the AI engine including: determining a net amount of the government-issued currency received, at an account associated with an operator of the system, from users of the system; determining, based upon the net amount of the government-issued currency received, a plurality of new tokens of the stable cryptocurrency to be created; determining an amount of the government-issued debt required to be purchased to collateralize the plurality new tokens of the stable cryptocurrency; creating, and issuing to digital wallets associated with the users of the system, the plurality of new tokens of the stable cryptocurrency.

The instructions for the AI engine may further include instructions for: determining a net amount of the government-issued currency withdrawn, at an account associated with an operator of the system, by users of the system; determining, based upon the net amount of the government-issued currency withdrawn, a plurality of existing tokens of the stable cryptocurrency to be destroyed; determining an amount of the government-issued debt required to be sold in connection with destruction of the plurality of existing tokens of the stable cryptocurrency; destroying the plurality of existing tokens of the stable cryptocurrency.

The instructions may further include instructions for periodically recalculating the first risk score, the user parameters used in recalculating the first risk score relating to a source of the government-issued currency provided by the first user, a source of wealth of the first user and a verification of an address of the first user.

The instructions may further include instructions for recalculating the first risk score in response to at least one of (i) a change in any of the user parameters, (ii) completion or attempt of a transaction involving the first digital wallet, (iii) counter party risk information including a second risk score and second ID verification classification for the second digital wallet.

The second digital wallet may be configured with a set of rules relating to transaction eligibility and may be further configured to determine whether the first risk score and the first ID verification classification comport with the set of rules. In addition, information relating to at least one of the first risk score and the first ID verification classification may be provided for review by the second user at the level of granularity determined by the granularity information used in generating the restricted use key.

The instructions may include instructions for adjusting the first risk score and a second risk score associated with the second digital wallet based upon transactions occurring between the first digital wallet and the second digital wallet.

In another aspect the disclosure relates to a method for facilitating the issuance and exchange of a stable cryptocurrency collateralized by government-issued debt, the method being implemented by a management platform in communication with a transaction validation and recording network including a plurality of distributed nodes configured to store blockchain data structures. The management platform includes a memory configured to store computer program instructions relating to at least a smart contract module and an ID and risk score module, the management platform further including one or more physical computer processors configured by the computer program instructions to implement at least the smart contract module and the ID and risk score module. The method includes establishing a first digital wallet associated with a first user and a second digital wallet associated with a second user. The method further includes determining, based upon user parameters and financial information associated with the first user, first wallet metadata for the first digital wallet wherein the first wallet metadata includes at least one of a first risk score and a first ID verification classification. The first wallet metadata is stored on a blockchain within the transaction validation and recording network. A restricted use key generated based upon granularity information associated with the first digital wallet enables the second digital wallet to access the first wallet metadata stored on the blockchain at a level of granularity determined by the granularity information. The method further includes receiving a first transaction request involving at least the first digital wallet and the second digital wallet and responding to the first transaction request based upon at least one of: (i) a comparison of the first wallet metadata to transaction rules associated with the second digital wallet, and (ii) user input provided by the second user upon consideration of the first wallet metadata at the level of granularity determined by the granularity information.

The disclosure also pertains to a method for facilitating the exchange of a stable cryptocurrency collateralized by government-issued debt, the method being implemented by a management platform in communication with a transaction validation and recording network including a plurality of distributed nodes. The management platform includes a memory configured to store computer program instructions relating to at least an ID and risk score module. The management platform further includes one or more physical computer processors configured by the computer program instructions to implement at least the ID and risk score module. The method includes receiving, through a first wallet interface of a first digital wallet, first granularity parameters of a first restricted use key. The first restricted use key is generated using the first digital wallet. The method further includes providing the first restricted use key to an owner of a second digital wallet and receiving a second restricted use key wherein the second restricted use key is generated by the second digital wallet based upon second granularity parameters received through a second wallet interface associated with the second digital wallet. The method also includes accessing, using the second restricted use key, information from a blockchain wallet wherein the information relates to one or more of an ID classification and risk score of the owner of the second digital wallet at a level of detail determined by the second granularity parameters. An indication to proceed with a transaction between the first digital wallet and the second digital wallet may then be received through the first wallet interface.

BRIEF DESCRIPTION OF THE FIGURES

The invention is more fully appreciated in connection with the following detailed description taken in conjunction with the accompanying drawings, in which.

DETAILED DESCRIPTION

Figure 1:
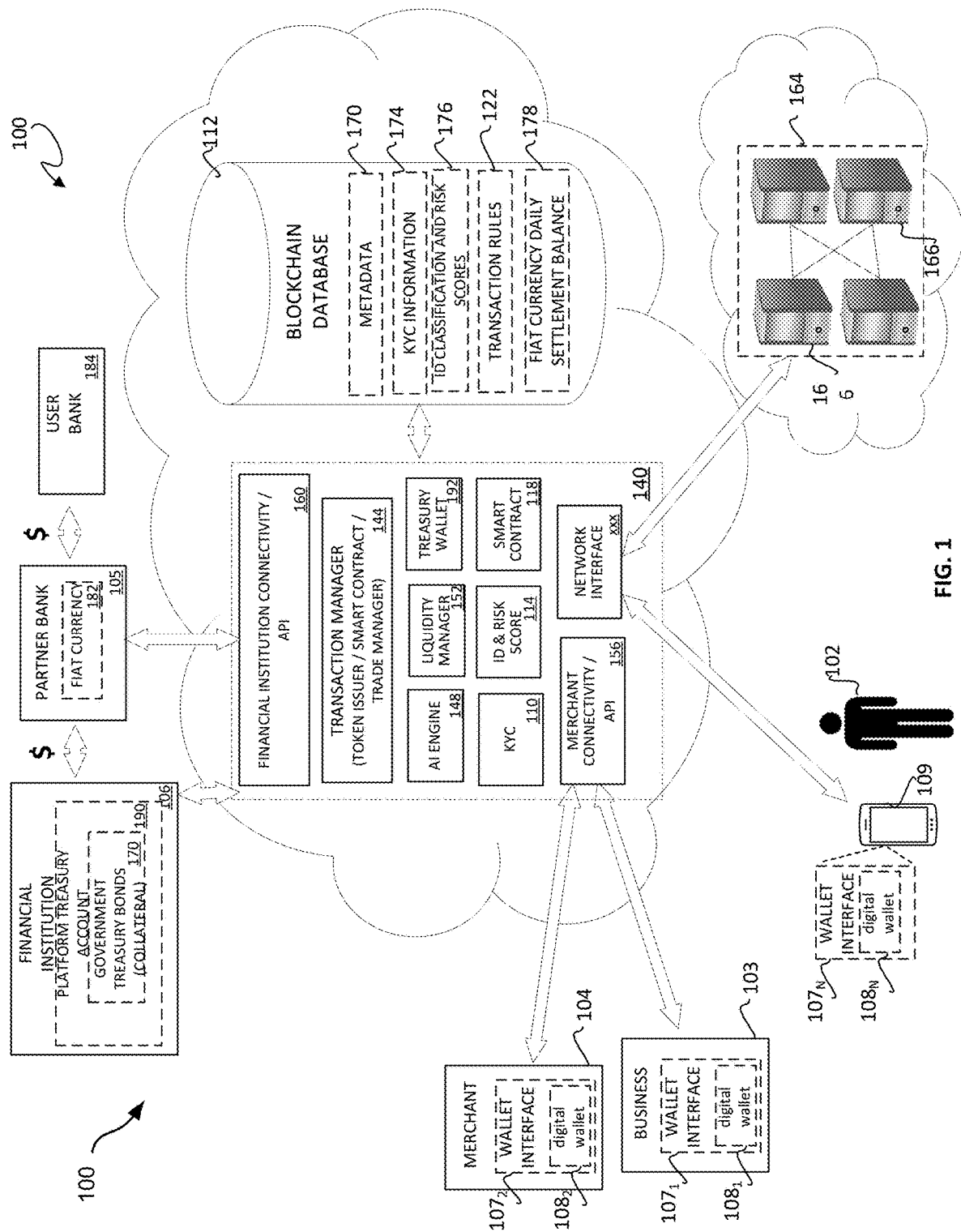
FIG. 1 provides a high-level overview of principal components of a system for providing tokenized assets backed by government bonds and for risk scoring transactions involving such tokenized assets.

Attention is now directed to FIG. 1, which provides a high-level overview of principal components of a system 100 for providing tokenized assets backed by government bonds and for risk scoring transactions involving such tokenized assets. As shown, the system 100 includes an AI-based management platform 140 configured to facilitate digital wallet transactions conducted by individuals 102, businesses 103 and merchants 104. As is discussed herein, the platform 140 communicates with wallet interface applications 107, which may be referred to simply as wallet interfaces 107, associated with or including digital wallets 108. During operation of the system 100, the tokenized assets may be transferred between the digital wallets 108, purchased and redeemed in the manner described herein.

In one embodiment the token transactions between digital wallets 108 are coordinated by the platform 140 in conjunction with the wallet interfaces 107. In the case of token transactions involving an individual 102, the wallet interface $107_N$ may be in the form of an application executed by, for example, a mobile communication device 109 in communication with a network interface 141 of the platform via one or more wireless or other networks (not shown). Of course it may be appreciated that the wallet interface $107_N$ may be executed by any number of personal electronic devices such as, for example, notebook or tablet computers, desktop computers, and the like. In the case of a business 103 or a merchant 104, the wallet interface $107_1$, $107_2$ may be executed by, for example, computing infrastructure (e.g., a desktop or notebook computer, server, mobile communications device, or the like) in communication with a merchant connectivity module 156 or API via one or more networks (e.g., the Internet). The system 100 also interfaces with banks 105 and other financial institutions 106 holding government debt 170 backing the tokenized assets held or associated with such tokenized assets.

The AI-based management platform 140 is configured with a number of functional modules. As shown, the AI-based management platform 140 includes a know your customer (KYC) module 110, an ID and risk score module 114, and a smart contract module 118. The AI-based management platform 140 further includes a token issuer/smart contract/trade manager module 144, a liquidity manager module 152, and a bank/financial institution connectivity interface 160.

The system 100 further includes a blockchain database 112 containing metadata 170 relating to the user digital wallets 108 and transaction rules 122 specified by owners if digital wallets 108. The transaction rules 122 are utilized by the smart contract module 118 and the transaction manager 144 in facilitating transactions between digital wallets 108. The database 112 further includes KYC information 174, and ID classifications and risk scores 176 of users. The transactions involving the digital wallets 108 are recorded as one or more blockchains (hereinafter "blockchain wallet" or "blockchain") within a transaction validation and recording network 164 including a plurality of distributed nodes 166. The ID and risk score module 114 determines a risk score for each digital wallet 108 based at least in part on such transactions in the manner described herein.

In one embodiment the tokenized crypto asset is pegged to a government issued fiat currency (e.g., USD, EUR). The token is collateralized by purchasing and holding government treasury bonds 170 (from the same nations the token is pegged to), except for funds which are in flight for settlement back to the pegged fiat currency. The government bonds 170 are kept in regulated financial institutions 106. In order to manage liquidity demands, a percent collateral in the fiat currency 182 is held in bank accounts in institutions 105 across the globe, solely for the purpose of conducting daily settlement transactions with the banks 184 of token holders requesting redemption back to the pegged fiat currency. The liquidity calculations are managed by an AI-based service provided by the AI engine 148. In one implementation this AI service determines the daily liquidity requirements and fiat settlement routes to utilize (e.g., through the use of least cost routing techniques).

In one embodiment the AI-based management platform 140 is implemented as a cloud-based platform. As is known, cloud computing may be characterized as a model for facilitating on-demand network access to a shared pool of configurable computing resources (e.g., networks, servers, storage, applications, nodes and services) that can be rapidly provisioned and released with minimal management effort or service provider interaction. Cloud systems tend to automatically control resource use by utilizing some form of metering capability with respect to, for example, storage, processing, bandwidth, and active user accounts. Various cloud service models are possible, including cloud software as a service (SaaS), cloud platform as a service (PaaS), cloud infrastructure as a service (IaaS) and user or networked participant deployed decentralized nodes, compromising a decentralized network running the software In one embodiment the platform 140 operates through an Amazon® Web Service Cloud. Of course, in other embodiments some or all of the platform 140 may be implemented using other cloud environments such as, for example, a Microsoft® Azure cloud or another third party cloud. In other embodiments the AI-based management platform 140 may be implemented by using on premise servers and other infrastructure rather than by using cloud-based services. Alternatively, hybrid implementations of the AI-based management platform 140 including a combination of on premise and cloud-based resources are possible, including the provision of the system using a decentralized network of independent nodes.

In one embodiment the metadata 170 stored by the smart contract module 118 comprises a user ID, KYC data and risk score. Metadata will generally be hashed and/or cryptographically encrypted and cannot be read by anyone without permission of the owner of the digital wallet 108 to which such metadata 170 pertains. In one embodiment an owner of a digital wallet 108 may grant such permission to a counter party (i.e., an owner of another digital wallet 108 by providing the counter party wallet owner with a restricted use key generated using the digital wallet 108 of the providing wallet owner.

Such a restricted use key manifests a wallet user's intent with regard to the degree of access to be provided to a counter party relative to ID classification, risk score and/or other information. In one embodiment the wallet interface 107 associated with the digital wallet 108 with respect to which a restricted use key is to be generated would be configured with a graphical user interface (GUI) through which the wallet owner could define the granularity of the restricted use key. In one implementation such granularity could, for example, determine what metadata 170 could be released to a counter party wallet owner provided with the restricted use key. The granularity defined through the wallet interface 107 could also determine usage limits (e.g., one-time use of the restricted use key (or a defined number of uses greater than one), expiration date of the restricted user key, etc.). The owner of the digital wallet 108 to which access is being provided could then deliver the restricted use key to the counter party wallet owner key via email, app-to-app communication between wallet interfaces 107, or through other electronic communication.

The AI engine 148 manages the balancing of the fiat currency and government bonds (treasury functions). The fiat currency requirements is based on the time needed to convert the government bonds to fiat and to support settlement demand on the network. The AI engine 148 also coordinates with the smart contract module 118 for issuance and burning of tokens based on fiat deposited or redeemed by users.

The KYC module 110 collects wallet owner personal or business data and validates it based upon geographic profiles and routines defined in smart contracts. This includes validation of submitted documents (passports, utility bills, corporate registration documents), validation against public databases, image comparison, fingerprinting from devices, device fingerprinting (i.e., IMEI of mobile phone).

Figure 2:
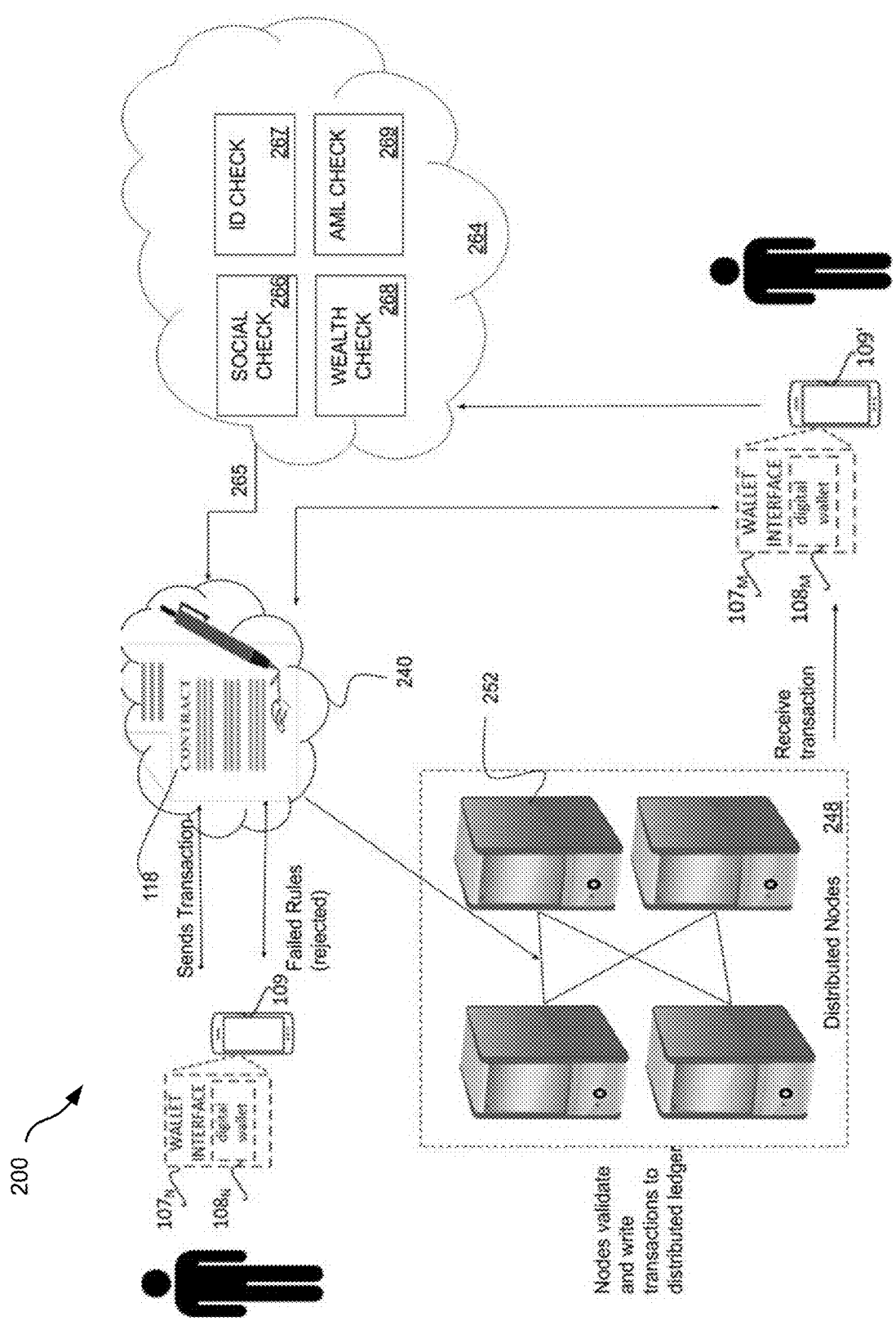
FIG. 2 illustrates a system to which reference will be made in describing operation of a smart contract module implemented in accordance with an embodiment.

Attention is now directed to FIG. 2, which illustrates a system 200 to which reference will be made in describing operation of the smart contract module 118. In the system of FIG. 2, the smart contract module 118 is instantiated on a cloud-based management platform 240 configured to implement the AI-based management platform 140. For purposes of clarity, the management platform 240 is depicted in FIG. 2 as including only the smart contract module 118, it being understood that the other modules of the platform 140 are integrated within the platform 240 but not illustrated in FIG. 2.

As shown in FIG. 2, the cloud-based management platform 240 is in communication with a transaction validation and recording network 248 including a plurality of distributed nodes 252. The nodes 252 of the network 248 record transactions between the digital wallets 108 of users of the system 200 to a distributed ledger. Each user may have a computing device 109 configured with a wallet interface 107 for facilitating such digital wallet transactions. A number of external data, technology and service providers 264 may provide a variety of validation or check information 265 to the cloud-based management platform 240 in connection with evaluating requests by new users to be issued digital wallets for use within the system 200. This information may include, for example, a social media profile check 266, an Identity check 267, a source of wealth check 268 and an anti-money launder (AML) check or sanctions check 269.

In one embodiment the smart contract module 118 and the transaction manager 144 carry out a series of validations and controls in relation to wallet creation, transfers and data recording. The validations and controls may include, for example: (1) wallet account creation; (2) wallet account validation (KYC), i.e., management of the registration of KYC to a wallet; (3) calculation of a risk score using wallet data and recording the current risk score of a wallet; (4) updating of transaction data in a wallet related to the users and its transactions; (5) management of the transfer and control of tokens of the stable cryptocurrency between two wallets using rules of sender and receiver; (6) management of the wallet owner rules for allowing/preventing token transfers (e.g., management of rules relating to KYC level of counterparty, risk score of counterparty, volume of transfers, velocity of transfers, min max size of token transfers, data files of a wallet user); (7) management of the issuance (minting) of new tokens and treasury validations for issuance; (8) management of the redemption and retiring (burning) of tokens.

In one embodiment all transactions between digital wallets 108 are managed by the smart contract module 118 and the transaction manager 144. That is, all wallet transactions flow through the platform 240 and are recorded by the smart contract module 118 in a blockchain wallet existing within the transaction validation and recording network 248. This advantageously enables the smart contract module 118 to enforce the transaction rules 122 established by each party to a transaction, thereby ensuring each party that their rules pertaining to their acceptance of a transaction will be honored. In this embodiment the ID and risk score module 114 may be configured to adjust the risk scores of the digital wallets 108 involved in the transaction on a real-time basis using the information relating to each transaction facilitated by the platform 240.

In other embodiments direct transactions will be permitted to occur between digital wallets 108 without involvement of the platform 240. In this case on or both of the wallet interfaces 107 associated with first and second digital wallets 108 involved in the transaction may participate in recording the transaction in the blockchain wallet within the transaction validation and recording network 248. In this case the smart contract module 118 will generally still be configured to read the blockchain history of the first and second digital wallets 108 recorded in the blockchain history. This enables the ID and risk score module 114 to appropriately adjust the risk scores associated with the first and second digital wallets 108 in the manner described hereinafter.

When a potential transaction between digital wallets 108 is facilitated by the platform 240, the smart contract 118 enforces the transaction rules 122 of each party to the transaction in order to make an initial determination of eligibility of the potential transaction. For example, a first digital wallet 108 of a first party to a potential transaction may be associated with transaction rules 122 pertaining to the risk score and/or ID verification classification of a second digital wallet 108 of a second party to the proposed transaction. If, for example, the manner in which the risk score and/or ID verification classification of the second party was established comports with the rules of the first party, the smart contract 118 may provide the wallet interface 107 associated with the first digital wallet 108 with an appropriately positive indication (e.g., a graphical user interface with one or more green checkmarks signifying transaction eligibility). Conversely, if the risk score and/or ID verification classification of the second party were not established in accordance with the rules of the first party, the smart contract 118 may provide the wallet interface 107 associated with the first digital wallet 108 with an appropriately negative indication (e.g., a graphical user interface with one or more red "X's" signifying transaction ineligibility).

In general, a finding by the smart contract 118 that a proposed transaction between first and second digital wallets is eligible to proceed (e.g., based upon an evaluation of the transaction rules 122 established by the owners of the first and second digital wallets,) does not automatically lead to execution of the proposed transaction. Instead, this positive initial determination of transaction eligibility may be communicated to the wallet interfaces 107 of the first and second digital wallets 108 in order to provide the users of such wallets 108 with information concerning the relative risks of the proposed transaction. At this point the users of the wallets 108 may be inclined to evaluate more granular information recorded within the blockchain wallet relating to the counter party to the proposed transaction. In one embodiment the granularity of the information available to a party of a proposed transaction is determined by the restricted use key provided to such party by the counter party to the transaction. In yet other embodiments the smart contract module 118 does not apply rules 122 to make an initial determination of eligibility of a proposed transaction. Rather, the owners of the first and second digital wallets 108 (i.e., the parties to the proposed transaction) are each enabled to evaluate information in the blockchain wallet associated with a counter party to the proposed transaction at a granularity determined by the restricted use key provided to such user by the counter party to the transaction. In this case the owners of the first and second digital wallets may make a decision as to whether or not permit a proposed transaction to proceed on the basis only of the information obtained by each party from the blockchain wallet using the restructured use key provided to such party by the counter party to the proposed transaction.

As an illustrative example, consider the case in which the transaction proposed between two digital wallets 108 relates to the sale of a vehicle. In this case the rules 122 associated with one or both of the digital wallets 108 may specify that data relating to KYC information must have been collected and in accordance with jurisdictional rules and that it meets a certain criteria. If the smart contract 118 confirms that this is the case, it may provide an appropriate positive indication to the wallet interfaces 107 associated with one or both of the digital wallets involved in the proposed transaction, as applicable. For example, the party corresponding to the seller of the vehicle could determine that the counter party (i.e., purchaser of the vehicle) is an ID verified customer from the United States. Depending upon the parameters of the restricted use key provided by the counter party to the seller of the vehicle, the smart contract module 118 could also provide the seller with an indication of a risk score of the counter party (e.g., low, medium or high risk). If the risk score of the counter party is low, this may inform the seller of the vehicle that the counter party has not been conducting transactions which appear suspect and has not been transacting with unscrupulous parties (as determined by their respective risk scores). At this point the seller of the vehicle may conclude that the counter party does not pose a money laundering risk since the counter party has been ID-verified and has a low risk score. Accordingly, the seller may inform the smart contract 118 via the wallet interface 107 that the seller is willing to receive the vehicle purchase price from the counter party.

On the other hand, to the extent the vehicle seller determines that the identity of the counter party is not up to date and/or the counter party has a high risk score, the seller may not elect to proceed with the transaction. The seller may have been able to make this determination because the smart contract module 118 informed the wallet interface 107 of the seller that the counter party did not comply with one or more rules of the seller and/or because the seller was able to acquire this information from the blockchain wallet at a level of granularity determined by the restricted use key provided to the seller by the counter party.

In one embodiment a counter party wallet owner will not have access to transactional information for another wallet owner included within the blockchain wallet recorded within the transaction validation and recording network 248 except to the extent enabled by the restricted use key provided to the counter party wallet owner. As indicated above, a wallet owner may tailor parameters of restricted use keys generated by the digital wallet 108 of the wallet owner via the associated wallet interface 107. For example, a restricted use key could be in the form of a QR code which, when scanned by a counter party possessing the QR code, provides a green checkmark or other indication through the counter party's wallet interface 107 that the identity of the wallet owner has been verified and the risk score of the wallet owner is low. In other cases a wallet owner may configured a restricted use key to provide more granular information concerning the wallet holder to a counter party. For example, the restricted use key could be generated such that when the counter party scans a QR code corresponding to the restricted use key, an image of the passport or related detailed information is provided to the counter party's wallet interface 107. As another example, a bank contemplating a transaction with an owner of a digital wallet 108 may request the owner to provide the bank with a copy of the wallet owner's passport, ID score, risk score, and countries in which the wallet owner has done business. In this case the wallet owner directs, via the wallet interface 107, the wallet owner's digital wallet 108 to create a restricted use key allowing bank personnel to view (through the bank's wallet interface 107) an image of the wallet owner's passport, the wallet owner's ID entity score, a list of countries with which the wallet owner does business, and the wallet owner's risk score. So representatives of the potential counter party (e.g., employees of the bank), would use the restricted use key (e.g., a QR code) to retrieve an image of the wallet owner's passport, credit information, ID score and/or ID verification status, etc. stored on the blockchain wallet. In this example the QR code acts as a private key to permit access to such images and information and/or access to a link to a file containing the image of the wallet owner's passport, etc. stored on the blockchain wallet where the link can be accessed using the QR code. In this example the restricted use key could also be utilized to return a list of the countries associated with counter parties with which the wallet owner has engaged in transactions over some defined time period or since the wallet owner began transacting through the platform 240. Accordingly, it may be appreciated that the digital wallet 108 of a wallet owner may be configured to generate a restricted use key that enables the type and granularity or identity verification and risk score information that is released to a counter party.

Attention is now directed to FIGS. 3-7, which are flow diagrams representative of various aspects of the operation of the system 100.

Figure 3:
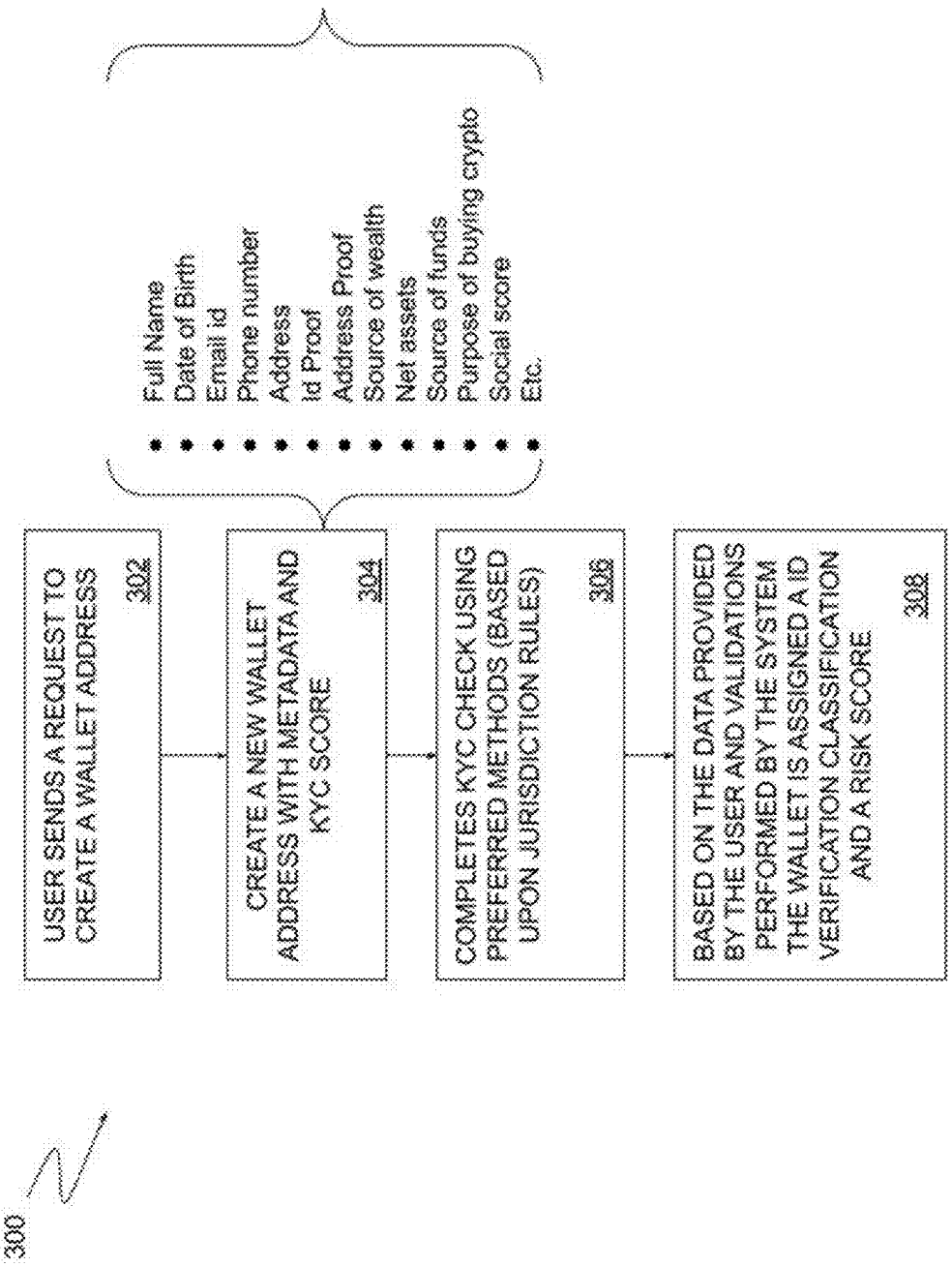
FIG. 3 is a flow diagram of an exemplary process for onboarding users to the system of FIG. 1.

FIG. 3 is a flow diagram of an exemplary process 300 for onboarding users to the system 100. As an initial step in the onboarding process a user 102 sends a request to the platform 140 to create a wallet address (stage 302). In response to the request, the transaction manger 144 creates a new wallet address with metadata and KYC score (stage 304). A KYC check is then completed using preferred methods (based upon jurisdiction rules) (stage 306). Based on the data provided by the user and validations performed by the system, the new digital wallet 108 is assigned an ID verification classification and a risk score (stage 308).

Figure 4:
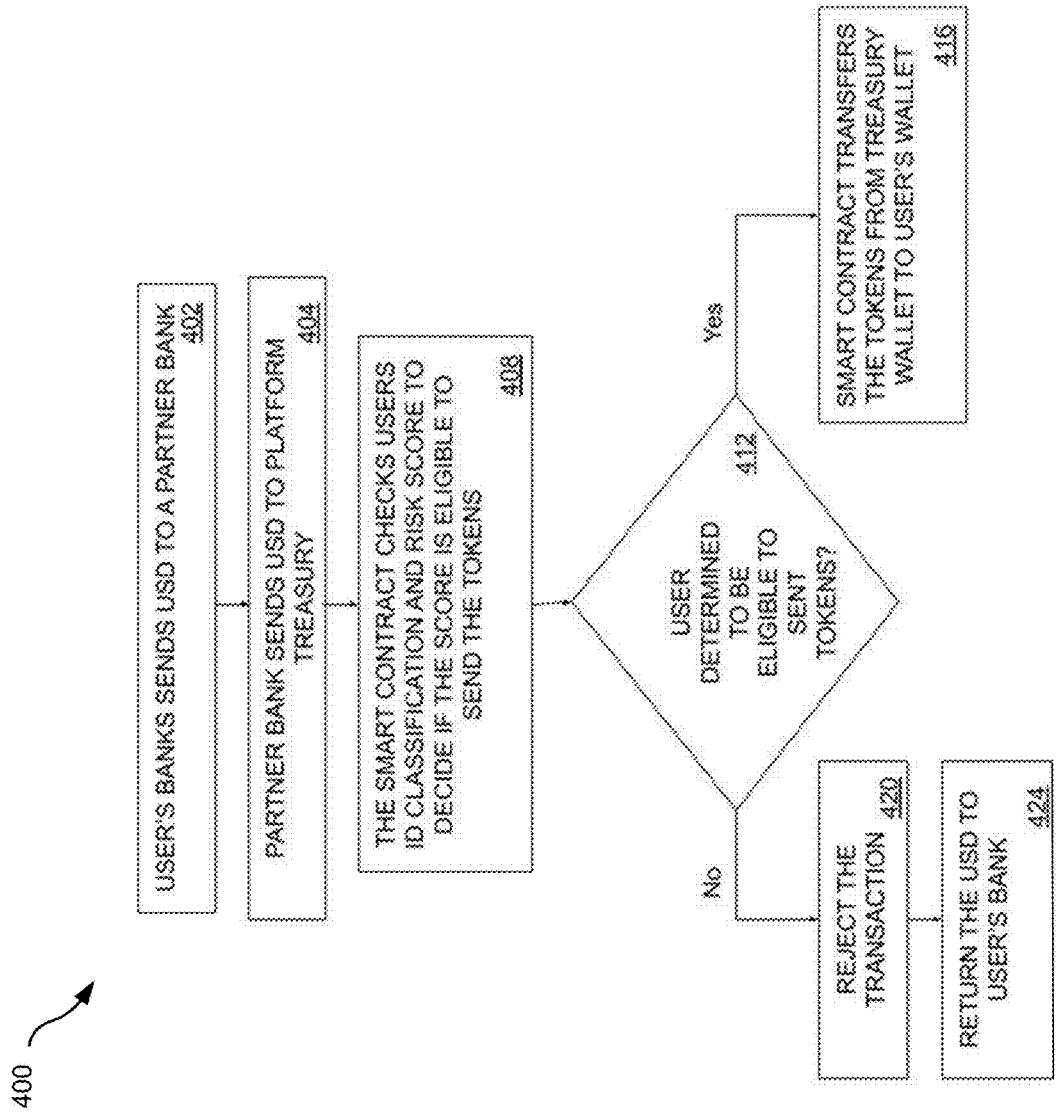
FIG. 4 is a flow diagram illustrating an exemplary process of a user purchasing a token for use within the system of FIG. 1.

FIG. 4 is a flow diagram illustrating an exemplary process 400 of a user purchasing a token for use within the system 100. As shown, a user's bank 184 initially sends a fiat currency (e.g., U.S. dollars) to the partner bank 105 (stage 402). The partner bank 105 then sends a corresponding amount of the fiat currency to a platform treasury account 190 associated with one or more entities such as, for example, one or more operator(s) of the platform 140 (stage 404). The smart contract module 118 then checks the ID classification and the risk score of the user to determine if the user is eligible to receive the tokens desired to be purchased (stage 408), i.e., the smart contract module 118 determines whether to approve the token purchase transaction to proceed or not). If the user is determined to be eligible to send the tokens (stage 412), the smart contract module 118 transfers the tokens from a treasury wallet 192 to the digital wallet 108; that is, the smart contact module 118 records the token transfer in the blockchain wallet existing within the transaction validation and recording network 164 (stage 416). If the user is determined to be ineligible to send the tokens (stage 412), the smart contract module 118 rejects the transaction (stage 420) and the fiat currency within the treasury account 190 is returned to the user's bank 184, either directly or via the partner bank 105 (stage 424). In one embodiment the partner bank 105 and the financial institution 106 maintaining the platform treasury account 190 may be the same institution.

Figure 5:
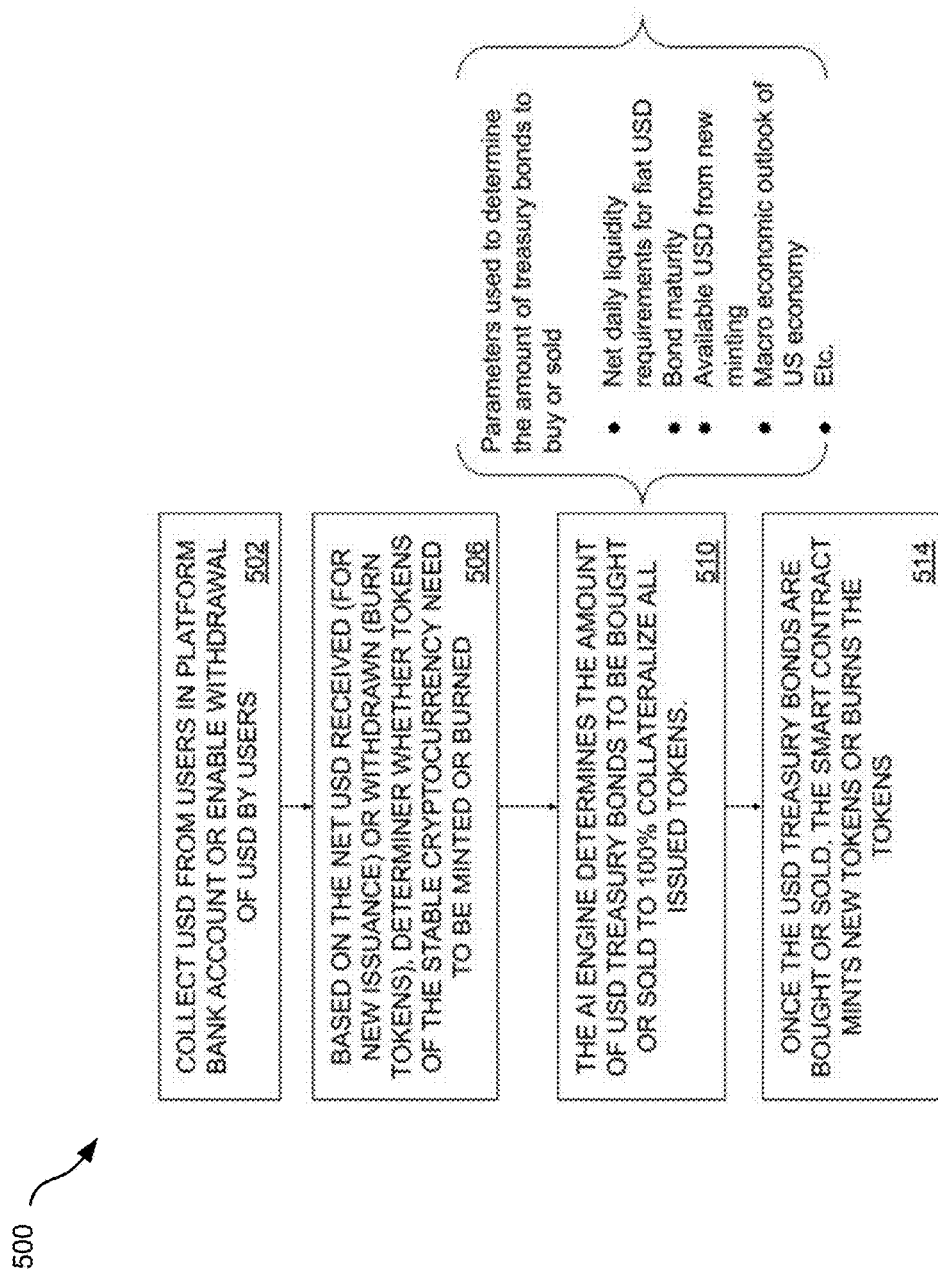
FIG. 5 is a flow diagram representative of an exemplary process of minting or burning tokens of the stable cryptocurrency within the system of FIG. 1.

FIG. 5 is a flow diagram representative of an exemplary process 500 of minting or burning tokens of the stable cryptocurrency within the system 100. The process of minting new tokens begin with the collection of a fiat currency (e.g., U.S. dollars) from users in the platform treasury account 190 (stage 502). This may occur by, for example, transfer of fiat currency from user accounts at one or more user banks 184 to a platform treasury account 190, potentially by way of a partner bank 105 utilized by the platform. Similarly, the process of burning, i.e., destroying tokens begins with the transfer of the fiat currency from the platform treasury account 190 in response to withdrawal transactions initiated by users (stage 502). Based on the net fiat currency received (for new issuance) or withdrawn (burn tokens), a determination is made as to whether new tokens of the stable cryptocurrency need to be minted or existing tokens burned (stage 506). The AI engine 148 determines the amount of treasury bonds in the fiat currency to be bought or sold to 100% collateralize all issued tokens (stage 510). In one embodiment the parameters used by the AI engine 148 in determining the amount of treasury bonds to be bought or sold include: net daily liquidity requirements for fiat USD, bond maturity, available USD from new mining, macro economic outlook of US economy, and the like. Once the treasury bonds are bought or sold, the smart contract module 118 mints new tokens or burns existing tokens (stage 514).

Figure 6:
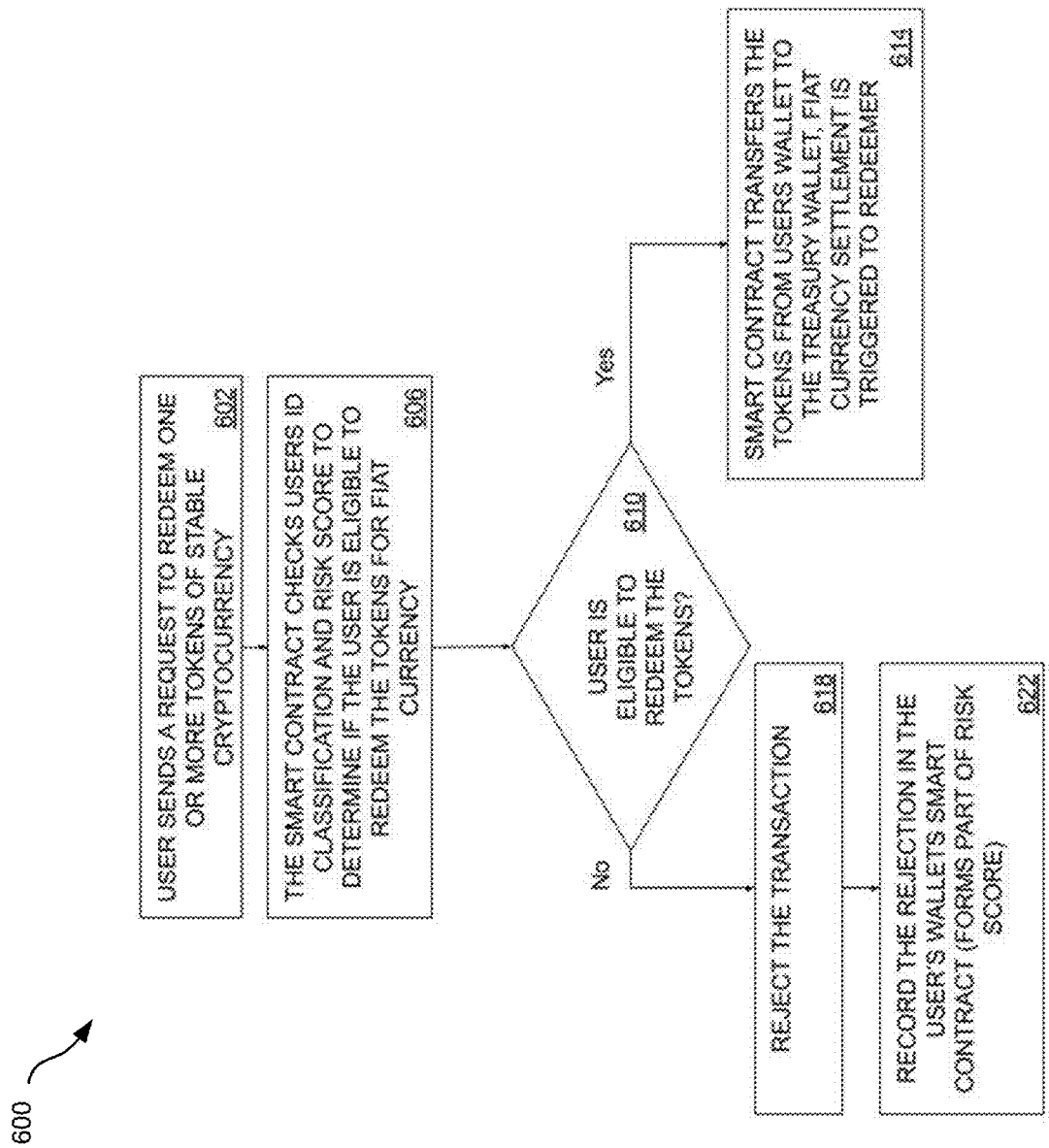
FIG. 6 is a flow diagram illustrating an exemplary process of a user transferring a token obtained from the system of FIG. 1.

FIG. 6 is a flow diagram illustrating an exemplary process 600 of a user transferring a token obtained from the system 100. The process 600 begins when the user sends a request to redeem one or more tokens of stable cryptocurrency (stage 602). The smart contract module 118 checks the ID classification and risk score of the user to decide if the user is eligible to redeem the tokens for fiat currency (stage 606). If the user is eligible to redeem the tokens (stage 610), the smart contract module 118 transfers tokens from the digital wallet 108 of the user to the treasury wallet 192 and a settlement in fiat currency is triggered to the redeeming user (stage 614). If the user is not eligible to redeem the tokens (stage 610), the transaction is rejected (stage 618). The rejection is then recorded in the blockchain wallet within the transaction validation and recording network 164 and may be taken into consideration by the ID and risk score module 114 when determining the risk score of the user (stage 622).

Figure 7:
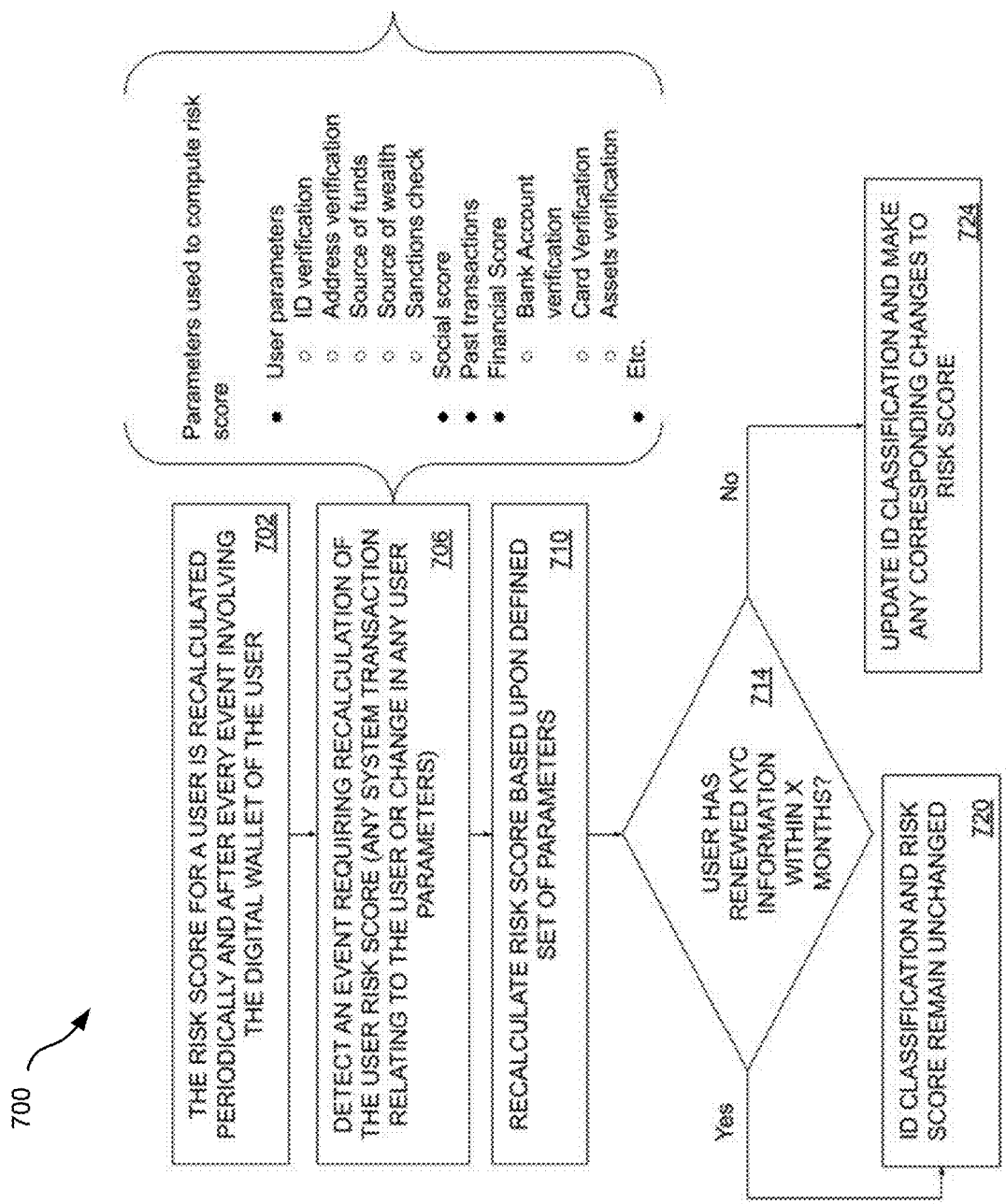
FIG. 7 is a flow diagram of an exemplary process for managing ID information and risk score according to an embodiment.

FIG. 7 is a flow diagram of an exemplary process 700 for managing ID information and risk score according to an embodiment. In one embodiment the ID and risk score module 114 is configured to recalculate a user's risk score periodically and after every event potentially affecting the user's risk score (stage 702). The process 700 includes detecting the occurrence of an event requiring recalculation of the risk score of a user (e.g., any system transaction relating to the user or change in any user or other parameters) (stage 706). In one embodiment various user parameters, a social score, past transactions (e.g., both completed transactions and proposed transactions for which information was exchanged between wallet owners but no transaction was consummated), and a financial score are used in computing a risk score. Exemplary user parameters may include, for example, ID verification, address verification, source of funds, source of wealth, a sanctions check, and the like. The financial score of the user may be based upon, for example, verification of a user's bank account, debit and credit cards and other assets.

Upon detecting an event potentially affecting the risk score of a user (stage 706), the user's risk score is recalculated based upon a defined set of parameters, such as those identified above (stage 710). The process 700 may also include periodically determining whether a user has renewed their KYC information within the preceding X months (e.g., X=12) (stage 714). If a user has renewed their KYC information within the preceding X months (stage 714), the ID classification and risk score for the user remain unchanged unless other relevant information has changed (stage 720). If a user has not renewed their KYC information within the preceding X months (stage 714), then the ID classification of the user is updated and any resultant changes to risk score are also made (stage 724).

In one embodiment an owner or user of a digital wallet 108 may add additional data such as, for example, immunizations, medical records or other potentially relevant profile information to the user's KYC information 174 and/or ID classification and risk scores 176. In the case of professionals, this additional profile information could include, for example, information relating to professional licenses and whether such licenses have been independently verified.

Figure 8:
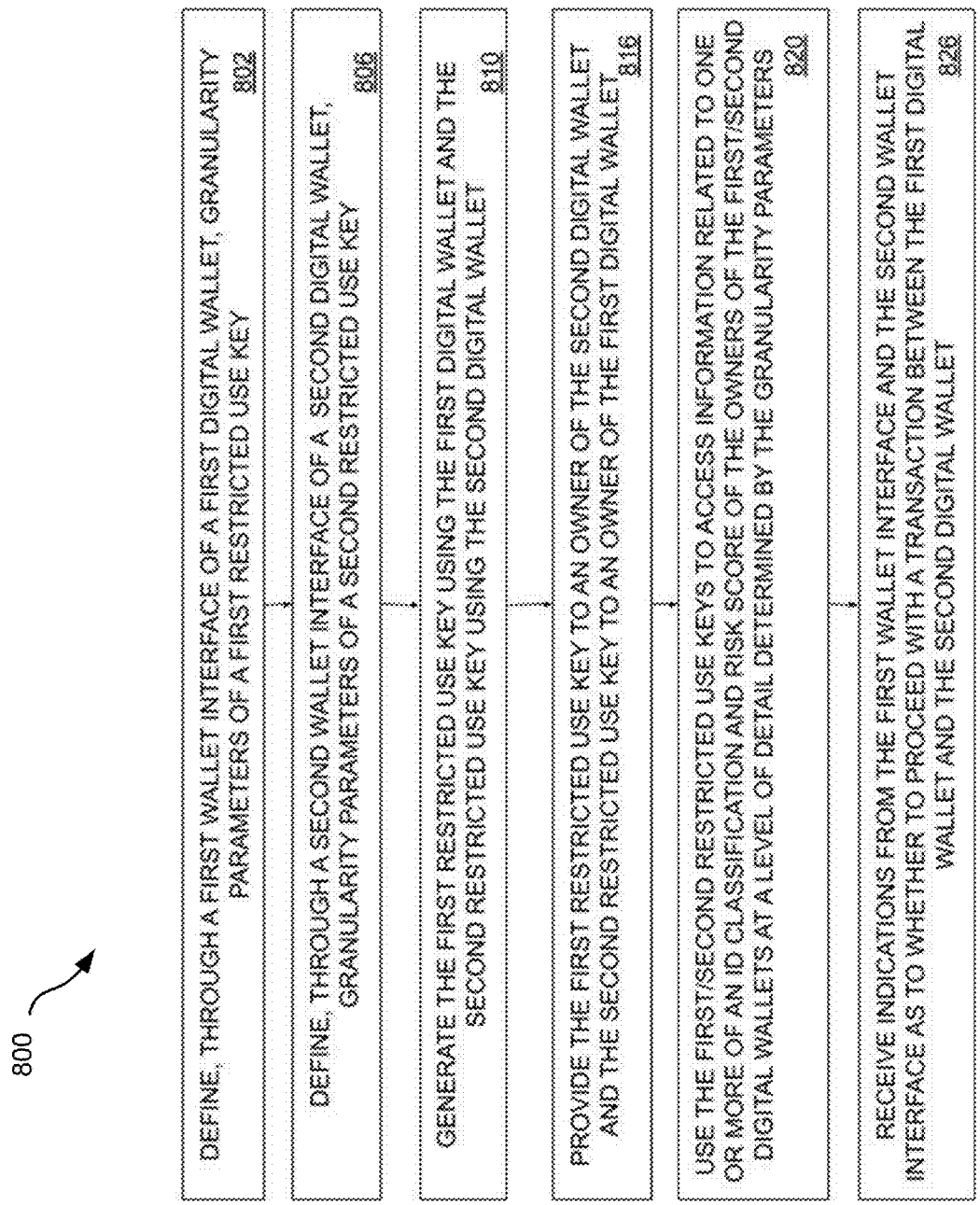
FIG. 8 is a flow diagram of an exemplary process by which each party to a potential transaction may access identification and classification information and a risk score for a counter party to a transaction at a level of granularity determined by a restricted use key generated by the digital wallet of the counter party.

FIG. 8 is a flow diagram of an exemplary process 800 by which each party to a potential transaction may access identification and classification information and a risk score for a counter party to a transaction at a level of granularity determined by a restricted use key generated by the digital wallet of the counter party. The process 800 includes defining, through a first wallet interface of a first digital wallet, granularity parameters of a first restricted use key (stage 802). The process 800 further includes defining, through a second wallet interface of a second digital wallet, granularity parameters of a second restricted use key (stage 806). The first restricted use key is generated using the first digital wallet and the second restricted use key is generated using the second digital wallet (stage 810). The first restricted use key is provided to an owner of the second digital wallet and the second restricted use key is provided to an owner of the first digital wallet (stage 816). Next, the first restricted use key may be used (e.g., on behalf of the owner of the second digital wallet) to access information related to one or more of an ID classification and risk score associated with the first digital wallet at a level of detail determined by the granularity parameters specified through the first wallet interface (stage 820). In like manner the second restricted use key may be used (e.g., on behalf of an owner of the first digital wallet) to access information related to one or more of an ID classification and risk score associated with the second digital wallet at a level of detail determined by the granularity parameters specified through the second wallet interface (stage 820). Indications may then be received from the first wallet interface and the second wallet interface as to whether to proceed with a transaction between the first digital wallet and the second digital wallet (stage 826).

It is possible that the owner of neither the first digital wallet nor the second digital wallet has specified any transaction rules, and thus there are no transaction rules 122 for the smart contract module 118 to utilize in making decision concerning transaction eligibility. In this case the owners of the first and second digital wallets make their own determination based upon visual inspection of the metadata 170 released by the restricted use key(s) provided to each party. In this case, the wallet owner decides whether a transaction is eligible to proceed, or optionally defines rules in the owner's wallet and/or wallet interface which then can be automatically enforced by the smart contract module 118.

Disclosed herein is a method for stabilizing the price of a tokenized asset by issuing new tokens from a smart contract in response to a new user introducing fiat money in the same currency as the tokenized asset. The received fiat money is then used to purchase government-issued treasury bonds or other government-issued debt.

The token may be listed and traded on alternate crypto asset exchanges globally. Each participant in the token system will be issued a wallet address comprising of a public and private key pair. In one embodiment each key pair and generated restricted use keys is associated with identity documents and or acceptable identity verification methods and risk data. The system may provide verification of the individual or corporate identity of the wallet holder and a risk score. The risk score may comprise a single value on a predefined scale and be influenced by, for example, wallet-related actions, transactions, KYC or KYB, geographical and other data inputs.

The KYC and/or KYB documents can be verified by more than one source to strengthen the score of the validity of the documents and the results of these confirmations are recorded on the block chain associated with the wallet address.

The KYC and KYB data verification data may be published in a governance model and be identified by a class conformity (i.e., conforms with BSA, conforms with EEA Central Bank, conforms with Chinese regulatory etc.).

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and may be compiled as executable machine language code or intermediate code that is executed on a framework or virtual machine.

In this respect, various inventive concepts may be embodied as a non-transitory computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The non-transitory computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

In addition, data structures may be stored in non-transitory computer-readable media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish a relationship between information in fields of a data structure, including through the use of pointers, tags or other mechanisms that establish relationship between data elements.

In addition, various inventive concepts may be embodied as one or more methods, of which an example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A computer-implemented system for facilitating the issuance and exchange of a stable cryptocurrency collateralized by government-issued debt, the system comprising:
   a management platform in communication with a transaction validation and recording network including a plurality of distributed nodes configured to store blockchain data structures, the management platform including:
      a memory configured to store computer program instructions relating to at least a smart contract module and an identity (ID) and risk score module; and
      one or more physical computer processors wherein the computer program instructions, when executed by the one or more physical processors, cause the one or more physical processors to perform operations including:
      establishing communication with a first user device of a first user and a second user device of a second user wherein a first wallet interface operates on the first user device and a second wallet interface operates on the second user device;
      receiving, from the first wallet interface, first user information and a first request to create a wallet address;
      receiving, from the second wallet interface, second user information and a second request to create a wallet address;
      determining a first Know Your Customer (KYC) score based upon at least some of the first user information;
      determining a second KYC score based upon at least some of the second user information;
      generating, based at least in part upon the first KYC score, a first risk score for the first user;
      generating, based at least in part upon the second KYC score, a second risk score for the second user;
      generating, in response to the first request, a first wallet address for a first digital wallet wherein the first wallet address is associated with the first risk score;

generating, in response to the second request, a second wallet address for a second digital wallet wherein the second wallet address is associated with the second risk score;

generating first wallet metadata for the first digital wallet by one or more of hashing and cryptographically encrypting at least one of the first risk score and a first ID verification classification wherein the first ID verification classification indicates whether a first ID of the first user has been verified;

generating second wallet metadata for the second digital wallet by one of more of hashing and cryptographically encrypting at least the second risk score;

sending, to the transaction validation and recording network, the first wallet metadata for recording in a first blockchain wallet associated with the first digital wallet;

sending, to the transaction validation and recording network, the second wallet metadata for recording in a second blockchain wallet associated with the second digital wallet;

determining a first amount of a government-issued currency received, at an account associated with an operator of the system, from the first user;

determining a second amount of a government-issued currency received, at the account associated with the operator of the system, from the second user;

issuing, in response to the determining the first amount of a government- issued currency received, a first plurality of tokens of the stable cryptocurrency to the first digital wallet by sending instructions to the transaction validation and recording network to record the first plurality of tokens on the first blockchain wallet;

issuing, in response to the determining the second amount of the government-issued currency received, a second plurality of tokens of the stable cryptocurrency to the second digital wallet by sending instructions to the transaction validation and recording network to record the second plurality of tokens on the second blockchain wallet;

receiving, from the first wallet interface, granularity information entered into the first wallet interface;

generating, for the first digital wallet, a first restricted use key having parameters determined by the first granularity information wherein the first restricted use key acts as a private key providing, based upon the parameters, access to the first wallet metadata through at least the second wallet interface;

providing access, using the first restricted use key, to at least a part of the first wallet metadata stored on the first blockchain wallet at a level of granularity determined by the granularity information wherein the granularity information determines one or more of: what part of the first wallet metadata may be released and a restriction on usage of the first restricted use key;

sending information corresponding to the at least a part of the first wallet metadata to the second wallet interface;

receiving, from one of the first wallet interface and the second wallet interface, a first transaction request involving at least the first digital wallet and the second digital wallet;

comparing, in response to the first transaction request, the first wallet metadata to transaction rules associated with the second digital wallet; and completing, at least in part in response to the comparing, a first transaction corresponding to the first transaction request by sending transaction recording instructions to the transaction validation and recording network to record a first transaction in association with at least one of the first blockchain wallet and the second blockchain wallet.

2. The system of claim 1, wherein the instructions causing the one or more physical processors to perform the operation of comparing further include instructions for causing the one or more physical processors to perform at least one additional operation of comparing the second wallet metadata to additional transaction rules associated with the first digital wallet.

3. The system of claim 1, wherein the instructions further include instructions causing the one or more physical processors to perform additional operations including:
receiving, from one of the first wallet interface and the second wallet interface, a second transaction request involving at least the first digital wallet and the second digital wallet;
comparing, in response to the second transaction request, the first wallet metadata to the transaction rules associated with the second digital wallet;
rejecting, based upon the comparing the first wallet metadata to the transaction rules associated with the second digital wallet, the second transaction request;
sending, to the transaction validation and recording network to record, instructions to record a rejection of the second transaction request in association with at least one of the first blockchain wallet and the second blockchain wallet.

4. The system of claim 3, wherein the additional operations further include adjusting the first risk score based on any of: (i) rejection of the first transaction request, (ii) acceptance of the first transaction request, and (iii) a completed transfer of a specified number of tokens of the stable cryptocurrency from the first digital wallet to the second digital wallet.

5. The system of claim 1, wherein the first transaction request corresponds to a transfer request and wherein the instructions further include instructions for causing the one or more processors to perform at least one additional operation including transferring, based at least in part upon the comparing, a specified number of tokens of the stable cryptocurrency from the first digital wallet to the second digital wallet.

6. The system of claim 1, wherein the instructions causing the one or more processors to perform the operation of determining a first KYC score further include instructions causing the one or more processors to perform at least one additional operation of performing a KYC check of the first user based upon rules applicable to a jurisdiction in which the first user is located wherein such rules include at least one of residence-based KYC laws and anti-money laundering (AML) laws.

7. The system of claim 1, wherein the instructions further include instructions causing the one or more processors to perform additional operations including:
receiving a second transaction request involving at least the first digital wallet;
evaluating the second transaction request based upon additional transaction rules associated with the first digital wallet.

8. The system of claim 7, wherein the second transaction request corresponds to a redemption request and wherein the additional operations further include redeeming, subsequent to the evaluating the second transaction request, a specified number of tokens of the stable cryptocurrency from the first digital wallet.

9. The system of claim 1, wherein the memory is further configured to store instructions for an artificial intelligence (AI) engine, the instructions for the AI engine including:
    determining a net amount of the government-issued currency received, at an account associated with an operator of the system, from users of the system;
    determining, based upon the net amount of the government-issued currency received, a plurality of new tokens of the stable cryptocurrency to be created;
    determining an amount of the government-issued debt required to be purchased to collateralize the plurality new tokens of the stable cryptocurrency;
    creating, and issuing to digital wallets associated with the users of the system, the plurality of new tokens of the stable cryptocurrency.

10. The system of claim 1, wherein the memory is further configured to store instructions for an artificial intelligence (AI) engine, the instructions for the AI engine including:
    determining a net amount of the government-issued currency withdrawn, at an account associated with an operator of the system, by users of the system;
    determining, based upon the net amount of the government-issued currency withdrawn, a plurality of existing tokens of the stable cryptocurrency to be destroyed;
    determining an amount of the government-issued debt required to be sold in connection with destruction of the plurality of existing tokens of the stable cryptocurrency;
    destroying the plurality of existing tokens of the stable cryptocurrency.

11. The system of claim 1, wherein the instructions further include instructions for periodically recalculating the first risk score, the user parameters used in recalculating the first risk score relating to a source of the government-issued currency provided by the first user, a source of wealth of the first user and a verification of an address of the first user.

12. The system of claim 1, wherein the instructions further include instructions for periodically recalculating the first risk score, the financial information used in recalculating the first risk score including information relating to bank account verification, credit card verification, and assets verification.

13. The system of claim 1, wherein the instructions further include instructions for recalculating the first risk score in response to at least one of (i) a change in any of the user parameters, (ii) completion or attempt of a transaction involving the first digital wallet, (iii) counter party risk information including a second risk score and second ID verification classification for the second digital wallet.

14. The system of claim 1, wherein the instructions further include instructions for causing the one or more processors to perform the additional operations including:
    determining, based upon at least one of the first risk score and the first ID verification classification, that the first digital wallet is eligible to receive a plurality of tokens of the stable cryptocurrency from the second digital wallet or in exchange for government-issued currency provided by the first user;
    transferring the plurality of tokens from a treasury wallet to the first digital wallet.

15. The system of claim 1, wherein the instructions further include instructions for causing the one or more processors to perform at least one additional operation of adjusting the first risk score based upon parameters of a transaction occurring between the first digital wallet and a second digital wallet.

16. The system of claim 1, wherein the second digital wallet is configured with a set of rules relating to transaction eligibility and wherein the instructions further include instructions causing the one or more processors to perform at least one additional operation of determining whether the first risk score and the first ID verification classification comport with the set of rules.

17. The system of claim 1, wherein information relating to at least one of the first risk score and the first ID verification classification is provided for review by the second user at the level of granularity determined by the granularity information used in generating the restricted use key.

18. The system of claim 1, wherein the instructions further include instructions for causing the one or more processors to perform at least one additional operation of adjusting the first risk score and the second risk score based upon transactions occurring between the first digital wallet and the second digital wallet.

19. The system of claim 1, wherein the instructions further include instructions for causing the one or more processors to perform at least one additional operation of adjusting the first risk score and the second risk score based upon a rejection of a transaction proposed between the first digital wallet and the second digital wallet.

20. The system of claim 1, wherein the first transaction request is a first transfer request and wherein the transaction recording instructions instruct the transaction validation and recording network to at least one of: (i) transfer at least one token from the first blockchain wallet to the second blockchain wallet, and (ii) transfer at least one token from the second blockchain wallet to the first blockchain wallet.

21. The system of claim 1, wherein the instructions causing the one or more physical processors to perform the operation of completing the first transaction corresponding to the first transaction request further include instructions causing the one or more physical processors to perform at the least one additional operation of receiving, from the second wallet interface, user input provided by the second user upon consideration of the first wallet metadata at the level of granularity determined by the granularity information, the user input indicating an intent to complete the first transaction.

22. The system of claim 21, wherein the instructions further include instructions which, when executed by the one or more physical processors, cause the one or physical processors to perform additional operations including:
    receiving, from the second wallet interface, additional granularity information entered into the second wallet interface;
    generating, based upon the additional granularity information, a second restricted use key governing access to the second wallet metadata;
    accessing, using the second restricted use key, at least a part of the second wallet metadata stored on the second blockchain wallet at a level of granularity determined by the additional granularity information;
    comparing, in response to the first transaction request, the second wallet metadata to additional transaction rules associated with the first digital wallet;
    wherein the instructions to complete the first transaction are further in response to the comparison of second wallet metadata to the additional transaction rules.

23. The system of claim 22, wherein the instructions causing the one of more physical processors to perform the operation of completing the first transaction corresponding to the first transaction request further include instructions causing the one or more physical processors to perform at least one additional operation of receiving, from the first wallet interface, additional user input provided by the first user upon consideration of the second wallet metadata at the level of granularity determined by the additional granularity information, the additional user input indicating an intent to complete the first transaction.

24. The system of claim 1 wherein the first wallet address includes a flag associated with the first ID verification classification, the flag indicating whether the first ID verification classification meets one or more accepted standards.

25. A method for facilitating the issuance and exchange of a stable cryptocurrency collateralized by government-issued debt in a system including a management platform in communication with a transaction validation and recording network having a plurality of distributed nodes, the management platform including a memory configured to store computer program instructions relating to at least a smart contract module and an ID and risk score module, the management platform further including one or more physical computer processors wherein the computer program instructions, when executed by the one or more physical processors, cause the one or more physical processors to perform the method, the method comprising:

establishing communication with a first user device of a first user and a second user device of a second user wherein a first wallet interface operates on the first user device and a second wallet interface operates on the second user device;

receiving, from the first wallet interface, first user information and a first request to create a wallet address;

receiving, from the second wallet interface, second user information and a second request to create a wallet address;

determining a first Know Your Customer (KYC) score based upon at least some of the first user information;

determining a second KYC score based upon at least some of the second user information;

generating, based at least in part upon the first KYC score, a first risk score for the first user;

generating, based at least in part upon the second KYC score, a second risk score for the second user;

generating, in response to the first request, a first wallet address for a first digital wallet wherein the first wallet address is associated with the first risk score;

generating, in response to the second request, a second wallet address for a second digital wallet wherein the second wallet address is associated with the second risk score;

generating, first wallet metadata for the first digital wallet by one or more of hashing and cryptographically encrypting at least one of the first risk score and a first ID verification classification wherein the first ID verification classification indicates whether a first ID of the first user has been verified;

generating second wallet metadata for the second digital wallet wherein the second wallet metadata includes at least the second risk score;

sending, to the transaction validation and recording network, the first wallet metadata for recording in a first blockchain wallet associated with the first digital wallet;

sending, to the transaction validation and recording network, the second wallet metadata for recording in a second blockchain wallet associated with the second digital wallet;

determining a first amount of a government-issued currency received, at an account associated with an operator of the system, from the first user;

determining a second amount of a government-issued currency received, at the account associated with the operator of the system, from the second user;

issuing, in response to the determining the first amount of a government-issued currency received, a first plurality of tokens of the stable cryptocurrency to the first digital wallet;

issuing, in response to the determining the second amount of the government-issued currency received, a second plurality of tokens of the stable cryptocurrency to the second digital wallet;

receiving, from the first wallet interface, granularity information entered into the first wallet interface;

generating, for the first digital wallet, a first restricted use key having parameters determined by the first granularity information wherein the first restricted use key acts as a private key providing, based upon the parameters, access to the first wallet metadata through at least the second wallet interface;

providing access, using the first restricted use key, to at least a part of the first wallet metadata stored on the first blockchain wallet at a level of granularity determined by the granularity information wherein the granularity information determines one or more of: what part of the first wallet metadata may be released to the second digital wallet and a restriction on usage of the first restricted use key;

sending information corresponding to the at least a part of the first wallet metadata to the second wallet interface;

receiving a first transaction request involving at least the first digital wallet and the second digital wallet;

comparing, in response to the first transaction request, the first wallet metadata to transaction rules associated with the second digital wallet; and completing, at least in part in response to the comparison of the first wallet metadata to the transaction rules, a first transaction corresponding to the first transaction request by sending transaction recording instructions to the transaction validation and recording network to record a first transaction in association with the first blockchain wallet and the second blockchain wallet.

* * * * *